No. 813,500. PATENTED FEB. 27, 1906.
C. KAUSCH.
TROLLING SPOON.
APPLICATION FILED SEPT. 21, 1905.
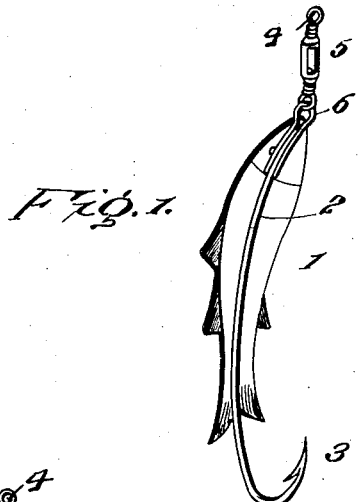
Fig. 1.
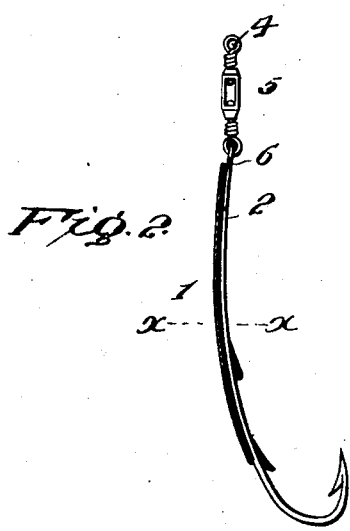
Fig. 2.
Fig. 3.
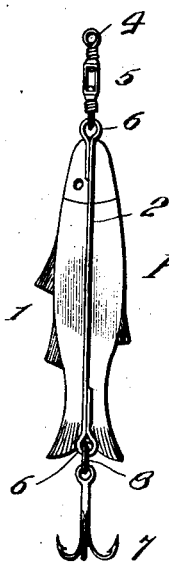
Fig. 4.
Fig. 6.
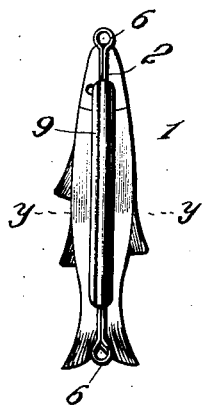
Fig. 5.
Fig. 7.
Witnesses
Inventor
C. Kausch,
By Lacey, Attorneys

UNITED STATES PATENT OFFICE.

CHARLES KAUSCH, OF BATH, NEW YORK.

TROLLING-SPOON.

No. 813,500. Specification of Letters Patent. Patented Feb. 27, 1906.

Application filed September 21, 1905. Serial No. 279,551.

*To all whom it may concern:*

Be it known that I, CHARLES KAUSCH, a citizen of the United States, residing at Bath, in the county of Steuben and State of New York, have invented certain new and useful Improvements in Trolling-Spoons, of which the following is a specification.

This invention provides a spoon bait or lure for trolling, the purpose being to devise a bait of this character which will be capable of a variety of movements, both as to darting and spinning, so as to attract attention of the fish.

An essential feature of the invention is a fin or rib, preferably located upon the inner or hollow side of the spoon and extending lengthwise thereof and having a medial arrangement, the purpose being to stiffen the spoon and to provide a guide to materially assist in directing the same in its various movements.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a trolling-spoon embodying the invention. Fig. 2 is a central longitudinal section thereof. Fig. 3 is a transverse section on the line $x\,x$ of Fig. 2. Fig. 4 is a side view of a modification. Fig. 5 is a side view of a further modification. Fig. 6 is a transverse section on the line $y\,y$ of Fig. 5. Fig. 7 is a transverse section showing a further modification.

Corresponding and like parts are referred to in the following description and indicated in all the views of the drawings by the same reference characters.

The spoon bait or lure 1 is preferably of a form to approximate the shape of a minnow or other nature of live bait commonly employed, according to the special kind of fishing. This spoon is preferably constructed of sheet material, such as metal, which is highly polished to glisten and produce the effect of light-rays upon the scale of live bait. In the present instance the lure is of oblong form and is longitudinally curved and is provided with a fin or rib 2 for the dual purpose of longitudinally stiffening and strengthening the device and to provide a guide to materially assist in the darting actions attendant upon the bait when in actual use. The fin or rib 2 is preferably arranged upon the inner or hollow side of the spoon and has a medial disposition, and is further utilized for attachment of the hook and the snood and line thereto. In some instances the fin or rib 2 consists of a wire, which is affixed to the spoon 1 in any substantial manner and which may be extended at one end to provide the hook 3, as indicated most clearly in Fig. 1, and which may be projected at the opposite end to provide an eye 4 to receive the swivel 5 or the snood or line, as may be desired. This latter construction is shown most clearly in Figs. 4 and 5. It is also contemplated to attach a loop to one end of the spoon or lure, as indicated in Fig. 1. The fin or rib and the loop 6 may be soldered or otherwise attached to the spoon. It is also intended to employ a multiple hook, as shown at 7 in Fig. 4, and the same may be connected to the lure in any manner. As indicated, the multiple hook is attached to the fin or rib 2 by means of a ring 8.

It is proposed to provide the fin or rib 2 in a variety of ways, either by means of a wire or by means of a strip 9 attached to the hollow or concaved side of the spoon and having a rib pressed outward therefrom intermediate of its longitudinal edges. This strip 9 may be used alone or in connection with a wire, and in the latter capacity it serves the function of a keeper, and the wire may be fast to the spoon or pass loosely between said spoon and the keeper. The fin or rib may constitute an integral part of the spoon or lure, and in this construction, as shown in Fig. 7, the material comprising the spoon is pressed outward to form a fold.

The provision of the fin or rib 2 enables the body of the spoon to be formed of exceedingly light sheet material, said rib serving to maintain the longitudinal curvature of the spoon and to sustain the draft when drawing home a catch. The darting action of the spoon is increased by the provision of the fin or rib, which also in this respect adds to the desirability of the device. The spoon, in addition to its longitudinal curvature, is transversely curved, thereby giving to the lure an approximately spoon shape, which is essential to the effective operation of the device.

Having thus described the invention, what is claimed as new is—

1. A trolling-spoon provided with a laterally-extended rib having its end portions projected, the one forming a hook and the other providing an attaching means for connection of the spoon to the line.

2. A trolling-spoon provided with a laterally-extended rib having its end portions projected, the one having an eye and the other a hook.

In testimony whereof I affix my signature in presence of two witnesses.

CHARLES KAUSCH. [L. S.]

Witnesses:
A. B. LACEY,
W. N. WOODSON.